Patented Jan. 9, 1945

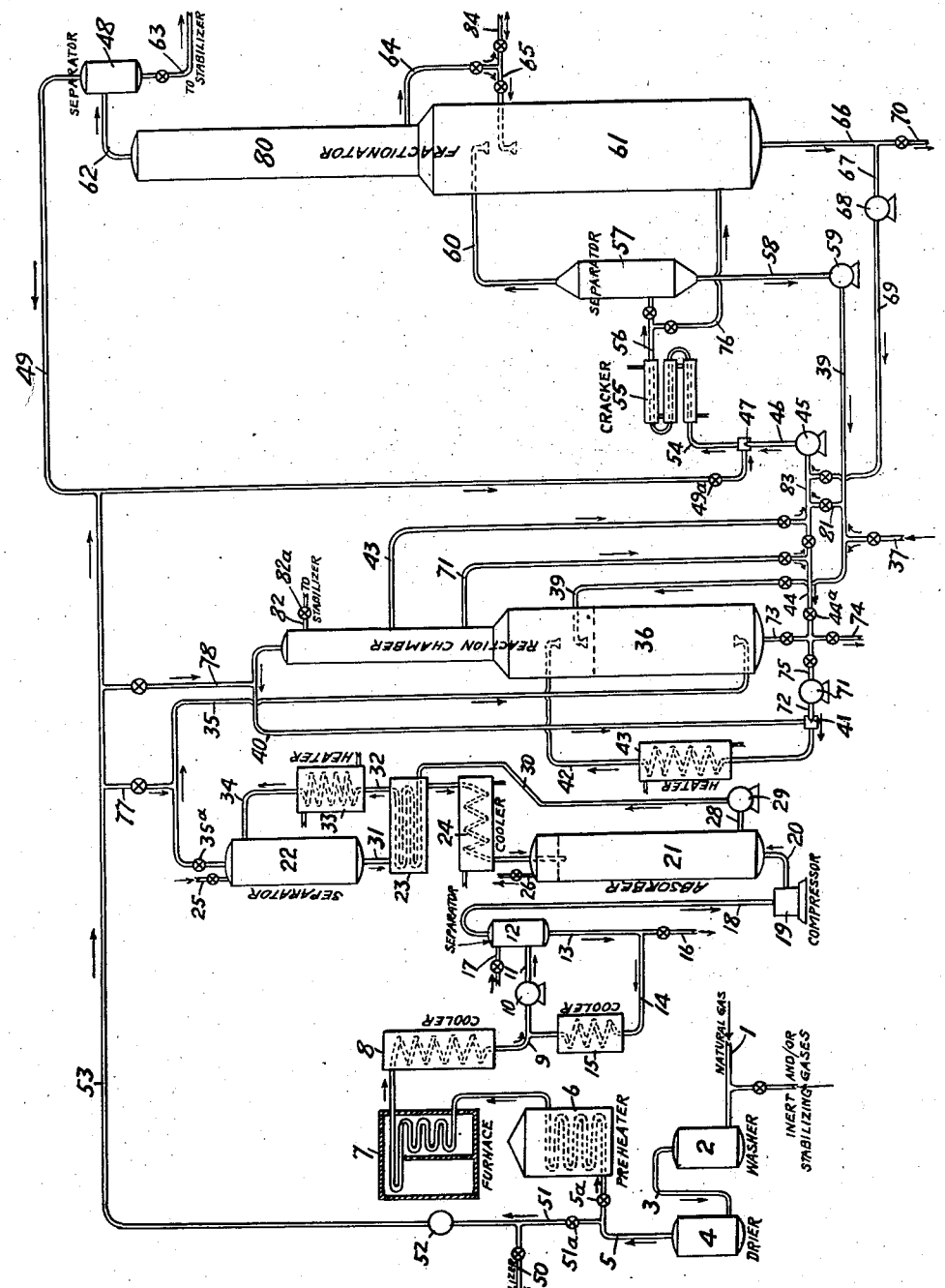

2,367,081

UNITED STATES PATENT OFFICE 2,367,081

PROCESS OF TREATING PETROLEUM HYDROCARBONS

Alexander N. Wojciekunas and John Faller, Jr., Erie, Pa., assignors to Chemical Process Development Corporation, Erie, Pa., a corporation of Pennsylvania Application March 4, 1940, Serial No. 322,096

16 Claims. (Cl. 260—683.15)

The object of our invention is broadly the production of petroleum products from crude petroleum or any fraction thereof by a continuous catalytic process and at a cost, per unit of ultimate product, much below that of any known thermal or catalytic process of cracking, polymerization or hydrogenation.

The most important adaptation of the process is the production, from any normally gaseous hydrocarbon, or from any mixture of such hydrocarbons, of any normally liquid hydrocarbon, such as gasoline. This particular embodiment of the process involves the reaction with aluminum of hydrogen chloride to form aluminum chloride and the reaction of aluminum chloride with naphthenic oil to form a light complex catalyst, or a mixture of light catalytic complexes, this catalyst circulating throughout the system. The normally gaseous hydrocarbons are, if necessary, first treated to effect their dehydrogenation to ethylene, such treatment, however, being unnecessary if the normally gaseous hydrocarbon to be processed comprises mainly olefinic gases. From such gases are then separated any inert gases and uncombined hydrogen after absorption in a suitable absorption oil, such as gas oil. The gases are then separated from the absorption oil and pass to a reaction chamber containing the specified catalyst and heavy oil, such as gas oil or fuel oil or both, the gaseous olefin therein condensing in the presence of the catalyst to liquid paraffins, olefins and naphthenes, the naphthenes and olefins being saturated by admission of unconverted normally gaseous saturated hydrocarbons to form saturated hydrocarbons by condensation. A part of the ultimately produced gasoline is separated as gasoline vapors in a fractionator forming part of said reaction chamber. The fractionated heavier and intermediate fractions are subjected to successive cracking operations in the last of which the remaining gasoline is fractionated.

The process also involves the forced circulation of the mixture of oil and catalyst in an endless stream through the reaction chamber and the injection into such stream of the uncondensed vapors escaping from the fractionating tower of the reaction chamber. The process also involves a circulation of oil and catalyst in an endless stream through the two cracking units specified and the injection into said stream of the uncondensed vapors escaping from the fractionating column of the second cracker. The process also involves the admission, from the source of supply of the normally gaseous hydrocarbon to be processed, of a regulable proportion of such hydrocarbon into the line carrying to the reaction chamber the gases to be processed, into the endless stream of oil and catalyst circulating through the reaction chamber and into the endless stream of oil and catalyst circulating through the second cracker. The process also involves the introduction of the liquid oil hereinbefore specified into the system only to start the process; no replenishment being required unless the process be so conducted as to crack any part of the initially added liquid oil. The process also involves the circulation of the catalyst compound through the entire catalytic reaction and cracking system, this compound being so light as to circulate freely and require no mechanical agitators in the reaction chamber or final cracker. The process also involves other minor but important features, which may be readily understood from the following description, read in connection with the drawing, which is a diagram or flow sheet of a complete apparatus adapted to practice the process in its preferable embodiment.

The invention will first be described as applied to the processing of natural gas and the production of gasoline therefrom. It will be understood that the pressures and temperatures specified are merely illustrative, being given to enable those skilled in the art to practice the process without the necessity of experimentation, and need not be strictly adhered to in order to successfully practice the process.

Natural gas from a source of supply enters line 1, passes on through washer 2 for the removal of carbon dioxide and other impurities and then through line 3 to drier 4 for the removal of moisture. The dry gas then passes through line 5 at a pressure of ten pounds per square inch to valve 5a, which automatically reduces the pressure to from 15 mm. to 100 mm. mercury absolute. Continuing through line 5 the gas is heated in preheater 6 to from 1,500 to 1,800° F. and in furnace 7 to from 1,800 to 2,300° F. This furnace may be of any suitable type, or any suitable heating medium may be used, provided the furnace or heating medium brings the temperature of the gas to be processed to the temperature specified quickly, and that the time of contact of the gas to the hot surface is limited to the time necessary for the decomposition to occur, the contact time being about 0.003 sec.

At this high temperature, methane decomposes through a complex chain reaction mechanism involving the production and degradation of free radicals each of which may then initiate a reaction chain by removing a hydrogen atom from another paraffin molecule and thus producing an alkyl radical and finally a molecule of olefin. (F. O. Rice J. A. C. S. 53, 1959 (1931); 54, 3529 (1932); 55, 3035 (1933). Ind. Eng. Chem. 26, 259 (1934).) At this point the reaction is stopped, as the gas passes from furnace 7 to cooler 8, wherein the gases are quickly cooled to about room temperature and thus made inactive. The gases then pass through line 9 to a point preceding vacuum pump 10, where the gas mixes with pump sealing liquid, then through pump 10 and line 11 into separator 12. Pump sealing liquid, separating from the gases, passes through line 13, line 14, cooler 15, line 9, pump 10 and back to separator 12. Fresh sealing liquid is admitted through line 17. Sealing liquid is removed through line 16.

The gases from separator 12 pass through line 18 to compressor 19 and are therein compressed to from 250 to 500 pounds per square inch.

Tank 21 is charged with a suitable absorption oil at the start of the process. This charge may be most conveniently made by charging tank 22 through line 25, the oil thence flowing, as hereinafter described, through heat exchanger 23 to tank 21. The compressed gases to be processed enter the bottom of tank 21 through line 20 and bubble up through the absorption oil and are largely absorbed. Unabsorbed gases are free to escape through line 26 at the top of tank 21. Any other suitable means may be used to remove hydrogen and/or inert gases at this point.

The oil carrying the absorbed hydrocarbon gases passes out of tank 21 through line 28 and is pumped by pump 29 through line 30, heat exchanger 23, line 32, heater 33 (wherein the admixture of oil and gas is heated to from about 200 to 400° F.) and line 34 into tank 22, wherein the hydrocarbon gas separates from the oil, the oil passing down from the bottom of tank 22 through line 31, heat exchanger 23 and cooling coil 24 to tank 21 to complete the cycle.

The gases separated from the oil in tank 22 escape through line 35 and valve 35a, at which point the pressure is reduced to a working pressure of from 250 to 450 pounds per square inch. The gases continue through line 35 and pass into the lower part of the reaction chamber 36, which has a series of plates, or is packed with a suitable packing material.

At the start of the process catalyst is charged in the form of a liquid composed of aluminum chloride combined with a naphthenic oil to form a complex catalyst having an orange color and produced in suitable equipment, not shown, by the reaction of hydrogen chloride on aluminum or aluminum scrap in the presence of a suitable oil. The charge enters the reaction chamber 36 by passing through line 37 and line 39. After this single charge of catalyst, additional catalyst is added only as necessary due to poisoning of the original charge of this material. The following formulas represent the lightest and the (desirably) heaviest of the catalyst complexes:

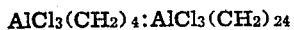

$$AlCl_3(CH_2)_4 : AlCl_3(CH_2)_{24}$$

After charging the reaction chamber 36 with the catalyst specified, it is charged with heavy oil, such as gas oil or fuel oil, until the chamber is about two-thirds full, after which the valves in lines 37 and 39 are closed. The mixture of oil and catalyst in the reaction chamber in continuously circulated by flowing it out of the bottom of the chamber through lines 73 and 75 to a centrifugal pump 71, which forces it through line 72, injector 41 (mixing there with light or uncondensed vapors from line 40 as hereinafter described) and line 42 (in which is interposed a heater 43), back to the reaction chamber 36.

The hydrocarbon gases from line 35, which, as above stated, enter the reaction chamber 36 near the bottom, pass upward counter-current to the circulating catalyst-oil admixture. The pressure maintained in the reaction chamber is, as above specified, from 250 to 450 pounds to the square inch. At this step in the process the olefinic gas condenses in the presence of the compound catalyst to paraffins, olefins and naphthenes. The naphthenes and olefins are saturated to form saturated hydrocarbons by alkylation.

Any gas that escapes the reaction leaves the top of the fractionating column of the reaction chamber 36 and is brought by line 40 to injector 41, there mixing with oil and catalyst outflowing from line 72, the gas being thereby returned, in such admixture, to the reaction chamber for further treatment.

The light gasoline vapors from the reaction are taken off near the top of the fractionating column of the reaction chamber 36 through line 82, the valve 82a in said line being more or less throttled to maintain the pressure in said chamber. The gasoline vapors go to a stabilizer (not shown). A medium fraction is taken off through lines 43 and a heavy fraction through line 71.

By having valve 44a in line 44 only slightly open, about 10% of the heavy fraction from line 71 will pass into line 44 and thence through line 75, admixed with the mixture of oil and catalyst from the bottom of the reaction chamber 36, to the pump 71; while the approximately 90% of the heavy fraction from line 71 passes into line 83 and, mixing with the medium fraction from line 43, flows through line 83 to pump 45, whence the oil is pumped through line 46, injector 47 and line 54, to and through a heater 55, which also functions to crack the oil. Element 55 is maintained at a temperature of from 450 to 600° F. It will be understood that the oil going to the cracking unit 55 is mixed with sufficient aluminum chloride-oil catalyst to greatly reduce the temperature required for cracking.

From the cracking unit 55 a minor part of the partly cracked oil passes through lines 56 and 76 to near the bottom of the fractionating tower 61 for the purpose of agitating the oil-catalyst mixture therein. The major part goes through line 56 into the separator 57, wherein the lighter and heavier fractions separate, the lighter fraction going through line 60 to the cracking tower 61 and the heavier fraction, carrying most of the catalyst, passing out of the bottom of the separator through line 58 to a pump 59, which, through line 39, forces such fraction into the reaction chamber 36, just above the liquid level therein. Alternatively the heavy oil from line 39 may be diverted, through line 81, to line 44, and thus recycled back to the cracking unit 55.

The lighter fraction from separator 57 passes, as above stated, through line 60 to the tower 61. The heavy fraction, carrying catalyst, leaves the bottom of the cracker 61 through lines 66 and 67 to the pump 68 and thence through line 69 to line 83 for recycling through the cracker 55 and separator 57.

The cracking reaction may not be completed in the cracker 55 but may be completed in the tower 61, which may thus function as a secondary or final cracker.

Light and medium vapors, carrying catalyst, pass upward to the fractionating tower 80. The medium vapors condense and leave the tower through line 64 and re-enter it through line 65 to cool rising vapors. At times it may be desirable to remove, through line 84, some of this medium fraction to a locus of catalyst and oil storage (not shown), where the catalyst may be separated from the oil and the oil returned to the cracker (61) through lines 84 and 65; or the oil-catalyst mixture may be fed through line 37 to line 39 and thence to the reaction chamber 36.

The reaction chamber 36 may be drained through line 74 and cracker 61 may be drained through line 70, both lines going to the locus of catalyst and oil storage. This drainage is normally effected only at the end of the operation, or, during the operation, to balance the catalyst that may be admitted to the system during the operation, thereby preventing the accumulation of too much catalyst in any unit of the plant.

The uncondensed vapors from the cracker 61 pass up through the tower 80 and escape through line 62 to the separator 48, wherein gasoline vapors condense and leave the bottom of the separator, through line 63, to a stabilizer (not shown). The (saturated) vapors uncondensed in separator 48 leave the top of the separator through line 49 and go through a throttling valve 49a to the injector 47, there mixing with the oil from line 46 and saturating the unsaturates therein. However, this unsaturated material is partly saturated again in cracking unit 55.

Since the quantity of uncondensed (saturates) vapors from separator 48 is insufficient for saturation of unsaturates, washed and dried natural gas in line 51 may be admitted, by opening valve 51a, into line 51, the gas passing on through compressor 52 and line 53 to line 49, there mixing with the vapors from separator 48. Saturated gases from the stabilizer (not shown) may also be admitted, for the same purposes of saturating unsaturates, through line 79 to line 1 or through line 50 to line 51. Stabilizer gases, when recycled, can be diluted with hydrogen escaping from the hydrogen extraction chamber through vent 26 in tank 21.

A small quantity of saturated gases from line 53 should be admitted through line 77 to line 35, this being done to bring about equilibrium in the reaction. Without this addition the reaction in chamber 36 would be carried too far.

It will be understood that the reaction hereinbefore described as occurring in the reaction chamber 36 is dependent upon the presence therein of a certain quantity of saturates which, as just described, may be admitted through line 77 and mixed with the unsaturated hydrocarbons (olefins) in line 35, the mixture then, by condensation and alkylation in the reaction chamber 36, being saturated to large molecules (paraffinic-naphthenic) boiling within the gasoline range or higher, the higher boiling hydrocarbons being cracked in the presence of saturated hydrocarbon gases admitted through line 49 and of the compound catalyst, to lighter and heavier hydrocarbons, the latter being recycled as described.

For the same purpose a small quantity of gas from line 53 should be admitted through line 78 to line 40.

The extent to which gas to be processed is admitted through lines 53 to the reaction chamber 36, to the mixture of catalyst and oil circulating through the reaction chamber 36 and to the mixture circulating through cracker 55 and separator 57 should be regulated to maintain a proper balance between the incoming material to be processed and the outgoing end product desired.

In the event that the process should be applied to the treatment of such refinery gases as contain a predominant, or any substantial, proportion of olefins, the gases, after washing and drying, may go direct to compressor 19 and absorber 21, wherein all the gases are absorbed except the paraffins, which escape through line 26. The released gases should go through the preheater 6, heater 7 and cooler 8 for conversion of the gases to olefins as hereinbefore described, such converted gases then going to compressor 19. It will be understood that the temperature to which such paraffinic gases should be subjected in this conversion step will depend upon the composition of the particular refining gas being processed.

What we claim and desire to protect by Letters Patent is:

1. The herein described process of treating normally gaseous hydrocarbons containing olefins which comprises reacting said hydrocarbons in gas phase with a mixture of a compound catalyst, formed by combining aluminum chloride with a hydrocarbon oil, and uncombined hydrocarbon oil, fractionating the products of the reaction into a lighter condensible fraction and a heavier condensed fraction carrying with it some of said catalyst, flowing a stream of the last named fraction to a cracking unit and therein cracking the same, adding to said stream flowing toward the cracking unit a regulable proportion of a saturated normally gaseous hydrocarbon in gas phase, separating the product of the cracking operation into lighter and heavier fractions, and returning the heavier fraction to the first named locus of reaction.

2. The herein described process of treating natural gas which comprises washing and drying the same, heating the same in two stages and in the later stage heating with maximum rapidity to a temperature within the range 1800-2300° F. to thereby convert a substantial proportion of the same to olefinic hydrocarbons, cooling said converted hydrocarbons to render said olefins inactive, compressing said cooled gases, absorbing them in a body of a normally liquid hydrocarbon absorbing oil in liquid phase and releasing therefrom unabsorbed gas, separating said absorbed olefinic gases from the body of liquid oil, reacting said gases with a mixture of a compound catalyst formed by contacting aluminum chloride with a hydrocarbon oil, and fractionating the products of the reaction.

3. The herein described process of treating natural gas which comprises washing and drying the same, heating the same to an elevated temperature to thereby convert a substantial proportion of the same to olefinic hydrocarbons, cooling said converted hydrocarbons to render said olefins inactive, compressing said cooled gases, absorbing them in a body of a normally liquid hydrocarbon absorbing oil in liquid phase and releasing therefrom unabsorbed gas, separating said absorbed olefinic gases from the body of liquid oil, passing the same, in admixture with a regulable proportion of saturated normally gaseous hydrocarbons, into a circulating stream of a mixture of normally liquid hydrocarbon oil and a catalyst formed by combining aluminum chloride with a hydrocarbon oil, to thereby, by condensation and alkylation, saturate said olefinic hydrocarbons to large hydrocarbon molecules, fractionating the products of the reaction into a light uncondensed fraction, a light condensible fraction and a heavier condensed fraction containing some of said catalyst, returning the light uncondensed fraction to the circulating stream, flowing a stream of the said heavier condensed fraction to a cracking unit and therein cracking the same, adding to the stream flowing toward the cracking unit a regulable proportion of a normally gaseous saturated hydrocarbon in gas phase, separating the product of the cracking operation into lighter and heavier fractions and returning the heavier fraction to the first named circulating stream.

4. The herein described process of treating natural gas which comprises washing and drying the same, heating the same to a temperature above 1800° F. to thereby convert a substantial proportion of the same to gaseous olefinic hydrocarbons, cooling said converted gaseous hydrocarbons while they are flowing in a closed stream, and therefore without admixture with other hydrocarbons, to render said olefins inactive, compressing said cooled gaseous hydrocarbons, absorbing them in a body of a normally liquid hydrocarbon absorbing oil in liquid phase and releasing therefrom unabsorbed gas, separating said absorbed olefinic gases from the body of liquid oil, reacting said gases with a mixture of a compound catalyst, formed by containing aluminum chloride with a hydrocarbon oil, and fractionating the products of the reaction.

5. The herein described process of treating natural gas which comprises preheating the same to a temperature below 1800° F. and then heating the same as rapidly as possible to a substantially higher temperature above 1800° F. to thereby convert a substantial proportion of the same to gaseous olefinic hydrocarbons, cooling said converted gaseous hydrocarbons to render said cooled olefins inactive, compressing said gaseous hydrocarbons, absorbing them in a body of a normally liquid hydrocarbon absorbing oil in liquid phase and releasing therefrom unabsorbed gas, separating said absorbed olefinic gases from the body of liquid oil, reacting said gases with a mixture of a compound catalyst, formed by contacting aluminum chloride with a hydrocarbon oil, and fractionating the products of the reaction.

6. The herein described process of treating normally gaseous saturated hydrocarbons comprising a substantial proportion of methane not less than that contained in natural gas, which comprises dividing said hydrocarbons into two streams, converting a substantial portion of the hydrocarbons of one stream to olefin, flowing the unconverted portion of said hydrocarbons in gas phase and said olefin in gas phase and also the hydrocarbons of the other stream into a reaction zone and there reacting said hydrocarbons with a compound catalyst, formed by combining aluminum chloride with a hydrocarbon oil, fractionating the products of the reaction, separating from the reaction products oil in liquid phase mixed with catalyst compound carried off therewith in said fractionation, and returning the last named mixture to the reaction zone.

7. The herein described process of treating normally gaseous hydrocarbons comprising a substantial proportion of methane not less than that contained in natural gas, which comprises heating the same in two stages and in the later stage, while under a substantial vacuum, heating to a temperature within the range 1800°-2300° F. and for a period of time not exceeding a small fraction of a second to thereby convert a substantial proportion of the same to gaseous olefin, cooling said olefin to render it inactive, compressing the cooled olefin, reacting said gaseous olefin with a catalyst complex comprising aluminum chloride and a hydrocarbon oil, and fractionating the products of the reaction.

8. The herein described process of treating normally gaseous hydrocarbons comprising a substantial proportion of methane not less than that contained in natural gas, which comprises heating the same in two stages and in the later stage, while under a substantial vacuum, heating to a temperature within the range 1800°-2300° F. and for a period of time not exceeding a small fraction of a second to thereby convert a substantial proportion of the same to gaseous olefin, cooling said olefin to render it inactive, compressing the cooled olefin, absorbing it in a body of a normally liquid hydrocarbon oil in liquid phase and releasing therefrom unabsorbed hydrogen, separating the olefin gas from the body of liquid oil, reacting said olefin gas with a catalyst complex comprising aluminum chloride and a naphthenic oil, and fractionating the products of the reaction.

9. The herein described process of treating normally gaseous hydrocarbons comprising a substantial proportion of methane not less than that contained in natural gas, which comprises heating the same in two stages and in the later stage, while under a substantial vacuum, heating to a temperature within the range 1800°-2300° F. and for a period of time not exceeding a small fraction of a second to thereby convert a substantial proportion of the same to gaseous olefin, cooling said olefin to render it inactive, compressing the cooled olefin, reacting said olefin, together with normally gaseous saturated hydrocarbons in gas phase, with a catalyst complex comprising aluminum chloride and a hydrocarbon oil, and fractionating the products of the reaction.

10. The herein described process of treating normally gaseous hydrocarbons comprising a substantial proportion of methane not less than that contained in natural gas, which comprises heating the same in two stages and in the later stage, while under a substantial vacuum, heating to a temperature within the range 1800°-2300° F. and for a period of time not exceeding a small fraction of a second to thereby convert a substantial proportion of the same to gaseous olefin, cooling said olefin to render it inactive, compressing the cooled olefin, absorbing it in a body of a normally liquid hydrocarbon oil in liquid phase and releasing therefrom unabsorbed hydrogen, separating the olefin gas from the body of liquid oil, reacting said olefin gas, together with normally gaseous saturated hydrocarbons in gas phase, with a catalyst complex comprising aluminum chloride and a hydrocarbon oil, and fractionating the products of the reaction.

11. The herein described process of treating normally gaseous hydrocarbons containing olefins which comprises reacting said hydrocarbons in gas phase with a mixture of a compound catalyst, formed by combining aluminum chloride with a hydrocarbon oil, fractionating the products of the reaction into a lighter condensible fraction and a heavier condensed fraction carrying with it some of said catalyst, flowing a stream of the last named fraction to a cracking unit and therein cracking the same, adding to said stream flowing toward the cracking unit a regulable proportion of a saturated normally gaseous hydrocarbon in gas phase, separating the product of the cracking operation into lighter and heavier fractions, and returning the heavier fraction to the first named locus of reaction.

12. The herein described process of treating normally gaseous hydrocarbons containing olefins which comprises reacting said hydrocarbons in gas phase with a mixture of a compound catalyst, formed by combining aluminum chloride with a hydrocarbon oil, fractionating the products of the reaction into a lighter condensible fraction and a heavier condensed fraction carrying with it some of said catalyst, subjecting a stream of the last named fraction, together with a regulable proportion of a saturated normally gaseous hydrocarbon in gas phase, to a cracking operation involving partial vaporization, subjecting the major part of the cracked product to a separating operation involving separation of lighter and heavier constituents, and returning the heavier fraction, carrying with it some catalyst, to the first named locus of reaction.

13. The herein described process of treating natural gas which comprises washing and drying the same, heating the same to an elevated temperature to thereby convert a substantial proportion of the same to olefinic hydrocarbons, cooling said converted hydrocarbons to render said olefins inactive, compressing said cooled gases, absorbing them in a body of a normally liquid hydrocarbon absorbing oil in liquid phase and releasing therefrom unabsorbed gas, separating said absorbed olefinic gases from the body of liquid oil, passing the same, in admixture with a regulable proportion of saturated normally gaseous hydrocarbons, into a circulating stream of a catalyst formed by combining aluminum chloride with a hydrocarbon oil, to thereby, by condensation and alkylation, saturate said olefinic hydrocarbons to large hydrocarbon molecules, fractionating the products of the reaction into a light uncondensed fraction, a light condensible fraction and a heavier condensed fraction containing some of said catalyst, returning the light uncondensed fraction to the circulating stream, flowing a stream of the said heavier condensed fraction to a cracking unit and therein cracking the same, adding to the stream flowing toward the cracking unit a regulable proportion of a normally gaseous saturated hydrocarbon in gas phase, separating the product of the cracking operation into lighter and heavier fractions and returning the heavier fraction to the first named circulating stream.

14. The process defined in claim 15 wherein the said intermediate fraction or fractions, in admixture with normally gaseous saturated hydrocarbons in gas phase, are subjected to a cracking operation.

15. The herein described process of treating normally gaseous hydrocarbons comprising a substantial proportion of methane not less than that contained in natural gas, which comprises preparing a catalyst compound made by the action of hydrogen chloride on aluminum in the presence of a hydrocarbon oil, converting a substantial proportion of said gaseous hydrocarbons to gaseous olefin, establishing a circulating stream of said catalyst, flowing said gaseous olefin, together with normally gaseous saturated hydrocarbons in gas phase, into said circulating stream and therein effecting condensation of the gaseous olefin to liquid olefin and saturation of the mixture to paraffine and naphthenes, fractionating the products of the reaction into a light uncondensed gas fraction, a light condensible vapor fraction, one or more intermediate high boiling fractions, and a heavy highest boiling fraction, recirculating the heavy fraction with the circulating stream, returning the light uncondensed fraction to the circulating stream, and subjecting the intermediate fraction or fractions to a cracking operation.

16. The herein described process of treating normally gaseous olefinic hydrocarbons which comprises charging a reaction zone with an aluminum chloride-hydrocarbon oil catalyst compound, establishing a circulating stream of said catalyst compound through said reaction zone, passing said normally gaseous olefinic hydrocarbons while in gas phase, and in admixture with a regulable proportion of saturated normally gaseous hydrocarbons in gas phase, into said circulating stream to thereby, by condensation and alkylation, saturate said olefinic hydrocarbons to large hydrocarbon molecules and fractionating the products of the reaction into a lighter condensible fraction and a heavier condensed fraction carrying with it a portion of said catalyst, subjecting said heavier condensed fraction, in admixture with a regulable proportion of saturated normally gaseous hydrocarbons, to a cracking operation and separating the lighter and heavier products of the cracking operation.

ALEXANDER N. WOJCIEKUNAS.
JOHN FALLER, JR.